United States Patent [19]

Cook

[11] Patent Number: 4,779,984

[45] Date of Patent: Oct. 25, 1988

[54] METHOD AND APPARATUS FOR HOLOGRAPHIC SPECTROMETRY

[75] Inventor: Lacy G. Cook, El Segundo, Calif.

[73] Assignee: Hughes Aircraft Company, Los Angeles, Calif.

[21] Appl. No.: 17,941

[22] Filed: Feb. 24, 1987

[51] Int. Cl.$^4$ .................................................. G01J 3/45
[52] U.S. Cl. .................................... 356/346; 350/96.11
[58] Field of Search .................... 356/346; 350/96.11, 350/96.12

[56] References Cited

U.S. PATENT DOCUMENTS 4,523,846  6/1985  Breckinridge et al. ............. 356/346
4,558,951  12/1985  Ludman et al. ..................... 356/346

OTHER PUBLICATIONS

Anderson, "Integrated Optical Spectrum Analyzer: An Imminent Chip", IEEE Spectrum, pp. 22-29, Dec. 1978.

Kawata, "Fourier Transform Spectrometer with a Self-Scanning Photodiode Array", Applied Optics vol. 23, No. 2 (1984).

Primary Examiner—Davis L. Willis
Assistant Examiner—Matthew W. Koren
Attorney, Agent, or Firm—Ronald L. Taylor; W. J. Streeter; A. W. Karambelas

[57] ABSTRACT

An integrated optic holographic spectrometer (10) for analyzing electromagnetic radiation from a source (12) is disclosed. The holographic spectrometer (10) comprises a substrate (18) having aperture (20) for restricting the receipt of electromagnetic radiation. The spectrometer (10) also includes two optical waveguides (22, 24) for dividing the electromagnetic radiation received through the aperture (20) into at least a first and second portions. A geodesic lens (26) is provided for collimating the first and second portions of the electromagnetic radiation. Finally, the spectrometer (10) includes a linear detector array (28) optically communicating with the geodesic lens (26) to provide an output responsive to the interference between the first and second portions of the electromagnetic radiation received through the aperture (20).

21 Claims, 1 Drawing Sheet

METHOD AND APPARATUS FOR HOLOGRAPHIC SPECTROMETRY

BACKGROUND OF THE INVENTION

1. Field of the Invention

This invention relates to the field of spectrometry, and more particularly to a method and apparatus for holographic spectrometry.

2. Description of the Related Art

Upon excitation of atomic particles in an object, the particles may emit electromagnetic radiation having certain spectral characteristics. Interpretation of this emitted radiation may provide information on the molecular energy levels of the material forming the object, molecular geometries of the material, molecular bonding, as well as other information. By comparing the spectral information emitted by the object with known spectral characteristics, it is possible to determine the chemical composition and structure of the material as well as to permit quantitative chemical analysis.

There are two general approaches used in measuring spectral information. Under the dispersive approach, received electromagnetic radiation passes through a prism or a grating to separate the radiation into component wavelengths. The component wavelengths are then individually measured and recorded. Under the interferometric approach, the electromagnetic radiation is divided into two or more paths and then recombined to form an interference pattern. Spectral information can then be obtained by measuring and recording the interference pattern.

In one form of interferometric spectrometry known as real-time holographic spectrometry, a wave of electromagnetic radiation which has been stored in a hologram intefers with a subsequent wave of electromagnetic radiation. The interference pattern which is generated by the interference of the waves can then be interpreted to give spectral information. One such holographic spectrometer disclosed in Kawata, "Fourier Transform Spectrometer With a Self-Scanning Photodiode Array", Applied Optics, v. 23 n. 2 (1984) uses conventional optics to generate spectral information using fast Fourier transform techniques.

While such holographic spectrometers are somewhat effective, they were generally not fabricated from integrated optics and therefore were relatively large and costly. In addition, holographic spectrometers fabricated from conventional optics could not generally be used for imaging applications. Further, infrared holographic spectrometers were not generally cooled during operation and therefore tended to generate large amounts of thermal radiation which would often interfere with the operation of the elemental detectors. Even those holographic spectrometers which are cooled generally require relatively large devices to adequately remove the thermal energy generated by the spectrometers.

SUMMARY OF THE INVENTION

According to the preferred embodiment of the present invention, an integrated optic holographic spectrometer for analyzing electromagnetic radiation from a source is disclosed. The holographic spectrometer comprises a substrate having an aperture for restricting the receipt of electromagnetic radiation. The spectrometer also includes means such as two optical waveguides for dividing the electromagnetic radiation received through the aperture into at least a first and second portions. In the preferred embodiment, a geodesic lens is provided for collimating the first and second portions of the electromagnetic radiation. Finally, the spectrometer includes detector means such as a linear detector array optically communicating with the geodesic lens to provide an output responsive to the interference between the first and second portions of the electromagnetic radiation received through the aperture.

BRIEF DESCRIPTION OF THE DRAWINGS

The various advantages of the present invention will become apparent to one skilled in the art upon reading the following specification and by reference to the following drawings in which.

DESCRIPTION OF THE PREFERRED EMBODIMENT

Figure 1:
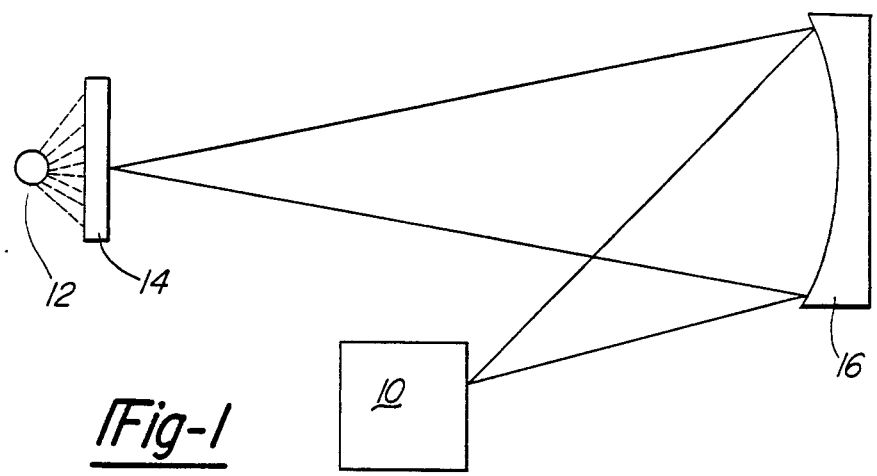
FIG. 1 is a diagrammatic illustration of the operation of a holographic spectrometer according to the present invention.

Referring to FIG. 1, a holographic spectrometer 10 according to the present invention is shown which is used to detect electromagnetic radiation. The holographic spectrometer 10 receives infrared radiation from a source 12 through a diffuser 14 and a re-imaging mirror 16. The re-imaging mirror 16 is used to symbolize the collecting telescope optics of a thermal imaging system and may be similar to that described in Hudson, *Infrared Systems Engineering*, John Wiley & Sons, 1969 at FIGS. 5–20, which is hereby incorporated by reference. The diffuser 14 is used to optically increase the uniformity of the thermal image delivered to the re-imaging mirror 16. While the diffuser may be fabricated from a ground dielectric transmission material, other suitable materials may be used.

The holographic spectrometer 10 includes a plurality of substrates 18 which are located adjacent to one another. Infrared radiation is received through the apertures 20 located on the sides of the substrates 18. It is to be understood, however, that other means for restricting the receipt of electromagnetic radiation may be used. The substrates 18 may be formed using standard integrated circuit technology and may be composed of gallium-arsinide, lithium-niobate, or other suitable materials.

To divide the electromagnetic radiation received through the apertures into two portions, each substrate 18 comprises a first waveguide 22 and a second waveguide 24. The first waveguide 22 optically communicates with the aperture 20 of the substrate 18 and delivers the electromagnetic radiation received therefrom to a geodesic lens described below. The second waveguide 24 is located adjacent to the first waveguide 22 to permit optical coupling of the electromagnetic radiation propagating in the first waveguide 22 to the second waveguide 24. By appropriate selection of the distance along which the first and second waveguides 22 and 24 optically communicate, a dual channel directional coupler is formed in which half the radiation entering the waveguide 22 is coupled to the waveguide 24. The first and second waveguides 22 and 24 create two separate paths for electromagnetic radiation so as to provide the necessary interference at the location in the substrate 18 where the electromagnetic radiation is to be detected.

Other means for dividing the electromagnetic radiation from the aperture 20 may be used including confluent beam splitters. The waveguides 22 and 24 may be formed by using ion implantation or ion diffusion to change the index of refraction of the substrate 18 in a region where the waveguides 22 and 24 are to be formed. It is to be understood, however, that other suitable techniques for forming the waveguides 22 and 24 may be used. The thickness of each of the waveguides 22 and 24 is selected to allow the desired mode of propagation of the electromagnetic radiation in the wavelengths 22 and 24. To permit the electromagnetic radiation entering the apertures 20 to propagate in the $TEM_{00}$ mode, the thickness for the waveguides 22 and 24 is chosen to be approximately on the order of the wavelength of electromagnetic radiation to be received.

Figure 2:
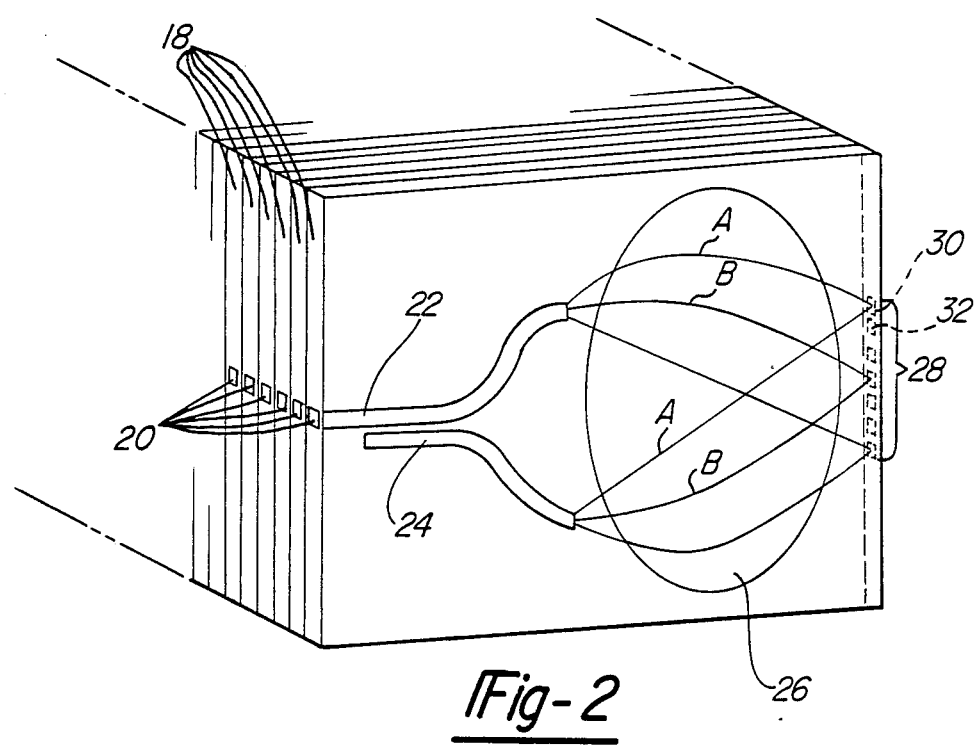
FIG. 2 is a frontal elevation of the holographic spectrometer according to the present invention.

To collimate the electromagnetic radiation propagating in the waveguides, each of the substrates further includes a geodesic lens 26. The geodesic lens 26 resides in a depressed portion in the substrate 18 and contains a layer of material which is similar to that which forms the waveguides 22 and 24. The geodesic lens 26 is used to collimate the electromagnetic radiation delivered by the waveguides 22 and 26, thereby causing the same portion of the wave fronts of the electromagnetic radiation travelling through the waveguides 22 and 26 to interfere at approximately the same location in th substrate 18. As shown in FIG. 2, those portions of the wave fronts delivered by the waveguides 22 and 24 designated as A interfere at the same location in the substrate 18. Similarly, those portions of the wave fronts delivered by the waveguides 22 and 24 designated as B interfere at the same location in the substrate 18. While the geodesic lens 26 may be used to collimate the electromagnetic radiation propagating in the waveguides 22 and 24, it is to be understood that other suitable means for collimating the electromagnetic radiation may be used.

To electrically indicate the spectral information collimated by the geodesic lens 26, a plurality of linear detector arrays 28 is provided. Each linear detector array is bonded to the edge of one of the substrates 18 at the end opposing the aperture 20. Each element of the linear detector array 28 delivers an electrical output in response to the collimated electromagnetic radiation received by that particular elemental detector. While the elemental detectors in the linear detector array 28 may be solid state photoconductive detectors, and fabricated from intrinsic or extrinsic semiconductor material, it is to be understood that other means for detecting electromagnetic radiation may be used.

Because the geodesic lens 26 collimates the electromagnetic radiation delivered by the waveguides 22 and 24, each elemental detector in the linear detector array 28 is able to receive a portion of the interference pattern created when the wave fronts propagating through the waveguides 22 and 24 combine. For example, the portion of the wave fronts travelling through waveguides 22 and 24 designated as A is received by the elemental detector 30, while the portion of the wave fronts travelling through waveguides 22 and 24 designated as B is received by the elemental detector 32. The outputs of the elemental detectors forming the array 28 can then be processed by using Fourier transformations to obtain spectral information concerning the object being viewed.

By employing integrated optics technology, the present invention may be used for both detecting spectral information as well as for imaging. When used to detect spectral information, the electromagnetic radiation emitted by the object is received by the substrate 18 through the apertures 20 and delivered to the waveguide 22. After approximately half of the electromagnetic radiation initially propagating through the waveguide 22 is coupled to the waveguide 24, the electromagnetic radiation propagating through each of the waveguides 22 and 24 is delivered to the geodesic lens 26 which collimates the radiation. The interference pattern generated by the interaction of the wave fronts which were propagating in the waveguides 22 and 24 is then detected by the elemental detectors forming the linear detector array 28. The signals generated by the elemental detectors may then be converted into digital form so they may be processed by a microcomputer system (not shown). The microcomputer system can then be used to reconstruct the spectrum using fast Fourier transform techniques. When used in imaging, the outputs from the individual elemental detectors forming the linear detector array 28 are used to generate a signal which is proportional to the photons received by the array 28. When used with the appropriate scanning technology, the outputs from each of the detector arrays 28 can be used to generate an image of the object being viewed.

It should be understood that the invention was described in connection with the particular example thereof. Other modifications will become apparent to those skilled in the art after a study of the specifications, drawings and following claims.

What is claimed is:

1. An integrated optic holographic spectrometer for analyzing electromagnetic radiation from a source comprising:
    means for restricting the receipt of said electromagnetic radiation;
    means for dividing the electromagnetic radiation received through said means for restricting electromagnetic radiation into at least a first and second portion, said means for dividing the electromagnetic radiation being integrated in a semiconductor substrate;
    means for collimating said first and second portions of said electromagnetic radiation, said means for collimating said first and second portions of said electromagnetic radiation being integrated in said semiconductor substrate; and
    means for detecting electromagnetic radiation optical communicating with said means for collimating said electromagnetic radiation.

2. The integrated optic holographic spectrometer of claim 1, wherein said means for restricting the receipt of said electromagnetic radiation comprises an aperture disposed on said substrate.

3. The integrated optic holographic spectrometer of claim 1, wherein said means for dividing comprises first and second waveguides, said first waveguides operable to receive electromagnetic radiation from said means for restricting the receipt of electromagnetic radiation, said first waveguide operable to deliver a portion of said electromagnetic radiation to said second waveguide.

4. The integrated optic holographic spectrometer of claim 1, wherein said means for collimating said first and second portions of electromagnetic radiation comprises a geodesic lens.

5. The integrated optic holographic spectormeter of claim 1, wherein said means for detecting electromagnetic radiation comprises a linear detector array optically communicating with said means for collimating said first and second portions of electromagnetic radiation.

6. The integrated optic holographic spectrometer of claim 1, wherein said means for detecting electromagnetic radiation comprises a detector array operable to generate an output indicative of the spectral characteristics of said electromagnetic radiation.

7. The integrated optic holographic spectrometer of claim 6, wherein said electromagnetic radiation carries imaging information from said source, said linear detector array being operable to generate an output responsive to the imaging information carried by said electromagnetic radiation.

8. The integrated optic holographic spectrometer of claim 1, wherein said means for detecting electromagnetic radiation detects the interference between said first and second portions of said electromagnetic radiation.

9. An imaging sensor operable to detect spectral information comprising:
a plurality of substrates, each of said substrates having means for restricting admission of electromagnetic radiation, means for dividing the electromagnetic radiation entering through said means for restricting into at least a first and second portion, means for collimating said electromagnetic radiation in said first and second portions, and means for detecting electromagnetic radiation which optically communicates with said means for collimating.

10. The imaging sensor of claim 9, wherein said means for detecting electromagnetic comprises a linear detector array.

11. The infrared imaging sensor of claim 10, wherein said means for restricting the admission of electromagnetic radiation comprises an aperture.

12. The infrared imaging sensor of claim 11, wherein said means for dividing the electromagnetic radiation comprises a plurality of optical waveguides.

13. The imaging sensor of claim 12, wherein said plurality of waveguides form a dual channel directional coupler.

14. The imaging sensor of claim 13, wherein said waveguides are formed by altering the index of refraction of the region of the substrate where said said waveguides are disposed.

15. The infrared imaging sensor of claim 14, wherein said means for collimating electromagnetic radiation comprises a geodesic lens.

16. The imaging sensor of claim 15, wherein said geodesic lens is formed by altering the index of refraction of the region of the substrate where said geodesic lens is disposed.

17. The integrated optic holographic spectrometer of claim 9, wherein said means for detecting electromagnetic radiation detects the interference between said first and second portions of said electromagnetic radiation.

18. A method for spectrally analyzing electromagnetic radiation comprising the steps of:
receiving electromagnetic radiation from a source through a first waveguide;
coupling a portion of the electromagnetic radiation propagating in said first waveguide into a second waveguide;
collimating the electromagnetic radiation propagating through said first and second waveguides; and
generating an output in response to the collimated electromagnetic radiation propagating through said first and second waveguides.

19. The method of claim 18, wherein said step of generating an output in response to the collimated electromagnetic radiation comprises the step of detecting the interference between the electromagnetic radiation propagating through said first and second waveguides.

20. The method of claim 19, wherein said step of coupling a portion of the electromagnetic radiation includes the step of permitting the received electromagnetic radiation to pass through a dual channel directional coupler.

21. The method of claim 20, wherein method comprises the additional step of generating an output responsive to the image carried by said electromagnetic radiation.

* * * * *